UNITED STATES PATENT OFFICE.

GODFREY LEWIS SMITH, OF NEWPORT NEWS, VIRGINIA.

PROCESS OF CURING CEMENT.

1,374,403. Specification of Letters Patent. Patented Apr. 12, 1921.

No Drawing. Application filed July 24, 1918. Serial No. 246,480.

*To all whom it may concern:*

Be it known that I, GODFREY L. SMITH, a citizen of the United States, residing at Newport News, in the county of Warwick and State of Virginia, have invented certain new and useful Improvements in Processes of Curing Cement, of which the following is a specification.

It is well known to those skilled in the art of manufacturing articles and structures of cement, cement mortar and concrete, that both the initial and the final hardening of such articles or structures is hastened by subjecting them to the action of heat and moisture, the moisture being necessary for the proper crystallization of the cement. The most convenient form in which to apply heat and moisture simultaneously to such articles is that of steam at atmospheric pressure, and this means I have used for a number of years. Steam may be thus applied as soon as the mortar or concrete is poured, without injury, and the material acquires practically its full strength in about 48 hours, depending somewhat on the thickness and shape of the molded article or structure.

It is also known to those skilled in the art that the initial and final set of cement is further hastened by applying steam at a higher pressure than that of the atmosphere. This process necessitates the inclosure of the article or structure in a pressure chamber. There is, however, a serious practical objection to the application of steam at pressures higher than that of the atmosphere to a freshly molded or poured article, and that is that such application causes the water within the pores of the cement, mortar or concrete to be thrown into a more or less violet state of ebullition, depending on the rate of increase in pressure and the mass of the article. In any event, such ebullition, involving as it does the formation of bubbles of steam or currents of water, or both, causes a breaking up of the cement crystals which are in process of formation and a consequent weakening, or disintegration of the cement, mortar or concrete.

For the economical operation of molds used in repetitive processes, it is very desirable to release the molds at the earliest possible moment, just as soon, indeed, as the product will stand handling without excessive breakage. It is, therefore, particularly advantageous in such operations, to hasten by every means which will not injure the product, the hardening of the cement. A rational way to accomplish this is to apply steam at atmospheric pressure until the initial set of the cement has occurred, that is, until the crystalline structure is definite enough to stand some internal disturbance; then to increase the pressure somewhat until the final set has taken place, after which any pressure and temperature of steam may be applied until the final strength of the cement, mortar or concrete is attained. This process, however, in the case of ordinary cements and articles of ordinary bulk and form, occupies from five to twelve hours and requires prolonged and most careful watching and involves the danger of running the steam pressure too high in the initial stages. Indeed, it is almost impossible to avoid heating the article being treated above the temperature corresponding to the boiling point of water at the existing atmospheric pressure, whereupon such excess temperature, as has been already pointed out, will surely cause disintegration of the cement crystals before initial set is complete.

These facts, which are recognizable as such by those familiar with the behavior of cement and of fluids like water, and which I have demonstrated repeatedly by experiment, have led me to seek a remedy which would be theoretically proper and practically applicable. I have discovered two such remedies, both based on the same general principle, that the boiling point of water is raised as the pressure increases.

In some cases, it is practicable, and perhaps, desirable to completely immerse the article to be seasoned in water. Here the procedure is to place the article in the pressure chamber, close the chamber, fill it with water and run the pressure of the water up to a point somewhat above that corresponding to the steam pressure desired in order to obtain a certain rapidity of set. Steam is next admitted until the temperature of the water in the chamber is that desired, after which only enough steam is admitted to hold the temperature constant until the curing process is complete; then the pressure is gradually reduced until atmospheric pressure is reached, after which the chamber may be opened, the article removed and the process repeated. Too sudden a release of the pressure may result in a violent expansion of the steam within the pores of the article and a consequent rupture of the structure.

In other cases, the article may not at once be immersed safely in water. Here the procedure is to place the article in the pressure chamber close the chamber and fill it with air at a pressure somewhat above that corresponding to the steam pressure desired in order to obtain a certain rapidity of set. Steam is next admitted until the temperature of the chamber is that desired, after which, if the nature of the article will permit it, water under pressure is admitted until immersion is complete and the curing process thus proceeds as above described.

In both cases the object is attained by preventing the active boiling of the water within the pores by means of pressure control, always having the pressure within the chamber greater by a safe amount than that corresponding to the temperature of the steam. By this means I have cured articles in a total time of one and one half hours to a strength which would have required a seasoning of 30 days in the air alone, and, in some cases, to a strength in excess of that which would or could be obtained by curing in air alone or in air and water.

I do not claim broadly the invention of the hastening of the set of cement by the application of heat, or the curing of articles of cement under pressure.

What I claim is:

1. A process of curing articles of cement, cement mortar or cement concrete, which consists of the application of heat and of the application and maintenance at all times of an air or gas pressure thereto and thereon in excess of the pressure of saturated steam having the temperature of the moisture within the pores of the cement, mortar or concrete.

2. A process of curing articles of cement, cement mortar or cement concrete which consists of the following steps: first, confining the article in a closed pressure cylinder; second, subjecting the article to pressure by means of compressed air or gas; third, introducing into the cylinder water having a temperature less than that of the air or gas already in the cylinder; fourth, applying heat to the article by heating the water surrounding the article, always, however, keeping the pressure of the compressed air or gas in the cylinder greater than that of saturated steam having the temperature of the water in the pores of the article; fifth, withdrawing the water; sixth, releasing the pressure in the cylinder to that of the atmosphere; seventh, removing the article from the cylinder.

3. A process of curing articles of cement, cement mortar or cement concrete which consists of the following steps: first, confining the article in a closed pressure cylinder; second, subjecting the article to pressure by means of compressed air or gas; third, introducing into the cylinder water having a temperature less than that of saturated steam whose pressure equals that of the air or gas already in the cylinder; fourth, applying heat to the article by heating the water surrounding the article, always, however, keeping the pressure of the compressed air or gas, in the cylinder greater than that of saturated steam having the temperature of the water in the pores of the article; fifth, after the final set of the cement, mortar or concrete, further applying heat, without reference to pressure of air or gas and temperatures of water, until any desired strength of the article is attained; sixth, withdrawing the water; seventh, releasing the pressure in the cylinder to that of the atmosphere; eighth, removing the article from the cylinder.

4. A process of curing articles of cement, cement mortar or cement concrete which consists of the following steps: first, confining the article in a closed pressure cylinder; second, subjecting the article to pressure by means of compressed air or gas; third, applying heat to the article by means of heating the air or gas, surrounding the article, always, however, keeping the pressure of the compressed air or gas in the cylinder greater than that of saturated steam having the temperature of the water in the pores of the article; fourth, releasing the pressure in the cylinder to that of the atmosphere; fifth, removing the article from the cylinder.

5. A process of curing articles of cement, cement mortar or cement concrete which consists of the following steps: first, confining the article in a closed pressure cylinder; second, subjecting the article to pressure by means of compressed air or gas; third, applying heat to the article by means of heating the air or gas surrounding the article, always, however, keeping the pressure of the compressed air or gas in the cylinder greater than that of saturated steam having the temperature of the water in the pores of the article; fourth, after the final set of the cement, mortar or concrete, further applying heat without reference to pressure of air or gas and temperature of water in pores, until any desired strength of the article is attained; fifth, releasing the pressure in the cylinder to that of the atmosphere; sixth, removing the article from the cylinder.

In testimony whereof I affix my signature.

GODFREY LEWIS SMITH.